United States Patent

Kitajima et al.

[11] Patent Number: 5,197,450
[45] Date of Patent: Mar. 30, 1993

[54] AIR-FUEL RATIO CONTROL SYSTEM FOR INTERNAL COMBUSTION ENGINE

[75] Inventors: Shinichi Kitajima, Wako; Yoshihiko Kobayashi, Haga, both of Japan

[73] Assignee: Honda Giken Kogyo Kabushiki Kaisha, Tokyo, Japan

[21] Appl. No.: 810,598

[22] Filed: Dec. 19, 1991

[30] Foreign Application Priority Data

Dec. 21, 1990 [JP] Japan .................. 2-404929

[51] Int. Cl.⁵ .................. F02D 19/08; F02D 41/14
[52] U.S. Cl. .................. 123/685; 123/1 A; 123/690
[58] Field of Search .............. 123/1 A, 479, 494, 685, 123/690

[56] References Cited

U.S. PATENT DOCUMENTS

| | | | |
|---|---|---|---|
| 4,986,241 | 1/1991 | Inoue et al. | 123/479 |
| 5,014,670 | 5/1991 | Mitsumoto | 123/494 X |
| 5,090,389 | 2/1992 | Oota | 123/494 X |

FOREIGN PATENT DOCUMENTS

| | | | |
|---|---|---|---|
| 1-244133 | 9/1989 | Japan . | |
| 2-21654 | 9/1990 | Japan | 123/479 |

Primary Examiner—Tony M. Argenbright
Attorney, Agent, or Firm—Nikaido, Marmelstein, Murray & Oram

[57] ABSTRACT

A air-fuel control system for internal combustion engines using a blended fuel composed of gasoline and alcohol for determining or presuming a correction factor due to alcohol concentration in the fuel when an alcohol sensor for detecting the same has failed. An average value of the $O_2$ feedback correction factor reflecting a deviation between a target air fuel ratio and an actual air-fuel ratio is obtained and based on it, a target value is determined. The average value is compared with upper and lower limits and when it reaches either one, the factor obtained when the sensor operated properly is adjusted by an amount to follow up the target value.

9 Claims, 3 Drawing Sheets

AIR-FUEL RATIO CONTROL SYSTEM FOR INTERNAL COMBUSTION ENGINE

BACKGROUND OF THE INVENTION

1. Field of the Invention

This invention relates to an air-fuel ratio control system for an internal combustion engine, and more particularly to the system of the engine in which a blended fuel composed of, for example, gasoline and alcohol is used.

2. Description of the Prior Art

Recent years have seen increasing use of alcohol and the like as alternative fuels to replace traditional engine fuels such as gasoline. While such alternative fuels are sometimes used as they are without blending, they are also often used as mixed with a conventional fuel. One example is the hybrid fuel known as M85, which consists of 85% methanol (methyl alcohol) and the remainder of gasoline.

The stoichiometric air-fuel ratios of hybrid fuels generally differ from those of conventional fuels. In particular, the stoichiometric air-fuel ratio of methanol is about 6.5:1, considerably different than that of about 15:1 for gasoline. Moreover, alternative fuels obtained from different sources or at different times are frequently found to differ in blending ratio. It is thus highly possible that the blending ratio of an alternate fuel contained in the fuel tank of an engine will change regularly. Since any change in the blending ratio means a change in the stoichiometric air-fuel ratio, it is necessary to adjust the amount of fuel supplied to the engine accordingly.

With this in mind, Japanese Laid-Open Patent Publication No. Hei 1-244133 proposes an improvement in a known system in which the actual air-fuel ratio during engine operation is detected from, for example, the oxygen content of the engine exhaust gas and the detected air-fuel ratio is used as the basis for feedback control of the fuel supply, the improvement being that amount of fuel supply is optimized by using an alcohol sensor to detect the alcohol concentration of the fuel and adjusting the amount of fuel supply on the basis of the detected alcohol concentration.

In such a system, since the alcohol sensor becomes an indispensable element insofar as a hybrid fuel containing alcohol is used, it becomes impossible to optimize the amount of fuel supply to the engine when the alcohol sensor fails (malfunctions or breaks down), because in such cases the alcohol detector will either output no alcohol concentration detection value at all or output one that deviates from the actual alcohol concentration of the hybrid fuel. The aforesaid feedback control thus becomes impossible. This is a particular problem during engine startup and acceleration because determination of the amount of fuel supply by open loop control under such circumstances is apt to make continued engine operation impossible.

SUMMARY OF THE INVENTION

This invention was accomplished in view of the foregoing problem and has as its object to provide an engine air-fuel ratio control system capable of controlling the amount of fuel supply to the optimum value even when the alcohol sensor fails.

This invention achieves this object by providing an air-fuel ratio control system for an internal combustion engine provided with a blended fuel of gasoline and alcohol and having a first device for detecting alcohol concentration in the fuel to obtain an alcohol correction factor and a control device for correcting an amount of fuel supply at least in response to the obtained alcohol correction factor. The improvement in the system comprises a second device for detecting oxygen content of the engine exhaust gas and a third device for determining the alcohol correction factor in response to the detected oxygen content when the first device has been found to fail.

BRIEF EXPLANATION OF THE DRAWINGS

These and other objects and advantages of the invention will be more apparent from the following description and drawings, in which.

DETAILED DESCRIPTION OF PREFERRED EMBODIMENT

An embodiment of the invention will now be explained with reference to the drawings.

Figure 1:
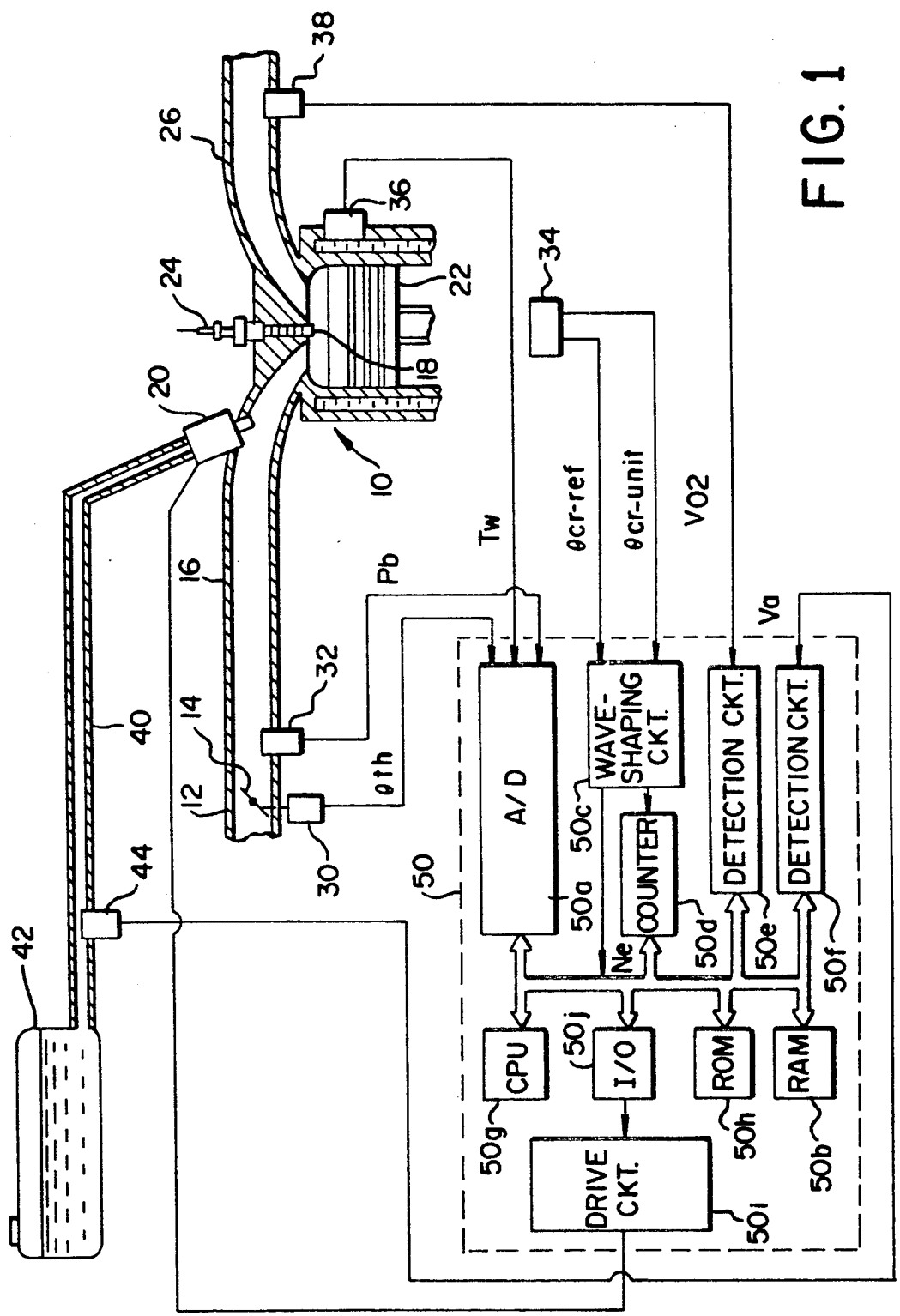
FIG. 1 is a block diagram showing the arrangement of an air-fuel ratio control system for internal combustion engines according to the invention.

In FIG. 1, a four-cylindered vehicle internal combustion engine 10 has an air intake passage 12. Air drawn in through an air cleaner, not shown, has its flow rate controlled by a throttle valve 14 and passes through a manifold 16 integrally connected to the passage to a combustion chamber 18, only one shown. A fuel injection nozzle 20 is provided in the vicinity of the chamber for supplying fuel. The intake air and the fuel are mixed and the resulting air-fuel mixture enters the chamber when an intake valve, not shown, is opened. After it is compressed in the chamber by a piston 22, the air-fuel mixture is ignited by a spark plug 24, whereupon it burns explosively to drive the piston down and the burnt gas is passed to the exterior through an exhaust passage 26 during engine exhaust stroke.

The air intake passage 12 is provided with a throttle position sensor 30 for generating a signal indicative of the opening degree $\theta$th of the throttle valve 14 and a manifold absolute pressure sensor 32, at a position downstream of the throttle valve 14, for producing a signal indicative of a manifold absolute pressure Pb. A crankshaft angle sensor 34 is provided to produce a reference signal $\theta$cr-ref once per 720 crankshaft degrees and a unit signal $\theta$cr-unit per a predetermined degrees. Further, a coolant temperature sensor 36 is provided to generate a signal indicative of a coolant temperature Tw. The exhaust passage 26 has an oxygen sensor 38 for generating a signal corresponding to the oxygen content $V_{O2}$ of the exhaust gas. The fuel injection nozzle 20 is connected, via a fuel supply conduit 40, with a fuel tank 42 containing a blended fuel composed of gasoline and methyl alcohol. An alcohol sensor 44 is equipped in the conduit for generating a signal indicative of the alcohol concentration Va of the fuel.

The output signals from all of the aforesaid sensors are sent to a control unit 50 made up of a microcomputer. In the unit, analog sensor signals are converted into digital signals through an A/D converter 50$a$ and are temporarily stored at a RAM 50$b$, a portion of which is backed up even when the engine is stopped. The outputs of the crankshaft sensor 34 are waveshaped by a circuit 50c and the signal θcr-unit is then input to a counter 50d to measure an engine speed Ne. The outputs of the oxygen and alcohol sensors 38,44 are sent to the detection circuits 50e,50f respectively. Based on the detected values, a CPU 50g calculates, in accordance with instructions stored in a ROM 50h, the amount of fuel to be supplied in a manner described later and outputs a signal Tout expressing the fuel supply amount in terms of an injection period, to a drive circuit 50i through an I/O port 50j, in order to drive the nozzle 20 to inject the fuel for the period. The signal Tout is defined as:

$$Tout = K \cdot Ti \cdot K_{O_2} \cdot Ka + T$$

In this equation, Ti is a basic fuel injection period corresponding to a fuel injection amount preset to obtain a stoichiometric air-fuel ratio with respect to the amount of intake air calculated from the engine speed Ne and the manifold absolute pressure Pb. K designates a correction factor such as a temperature correction factor Ktw for increasing the amount of fuel injected when the engine coolant temperature Tw is low or a load correction factor Kwot for increasing the amount of fuel injected in a high-load range defined in terms of the engine speed Ne, the manifold absolute pressure Pb and the throttle opening θth. T is an injection period correction factor used during transient operation and may, for example, be a fuel supply period correction time Tacc for increasing the amount of fuel injected during acceleration. $K_{O_2}$ is a feedback correction factor for eliminating the difference between the actual air-fuel ratio calculated from the oxygen content $V_{O_2}$ during feedback control ( the so-called "$O_2$ feedback control") and the preset stoichiometric air-fuel ratio, from which it will be understood that the value of the feedback correction factor becomes 1 during open loop control. Ka is an alcohol correction factor preset on the basis of the alcohol concentration Va detected by the alcohol sensor 44. The aforesaid open loop control is implemented when the signal Tout reaches or exceeds a prescribed reference value Twot, when the coolant temperature Tw is at or below a feedback control start temperature Two, and when the engine 10 is being started. The reference value Twot and the stoichiometric air-fuel ratio vary with the alcohol correction factor Ka.

The actual alcohol concentration of the fuel does not change when the vehicle equipped with the engine is being run since fuel cannot normally be supplied to the fuel tank 42 at such times. Therefore, the determination as to whether or not the alcohol sensor 44 has failed can, for example, be made on the basis of whether or not the fluctuation in the output value of the alcohol sensor 44 exceeds a prescribed value during vehicle running.

Figure 2:
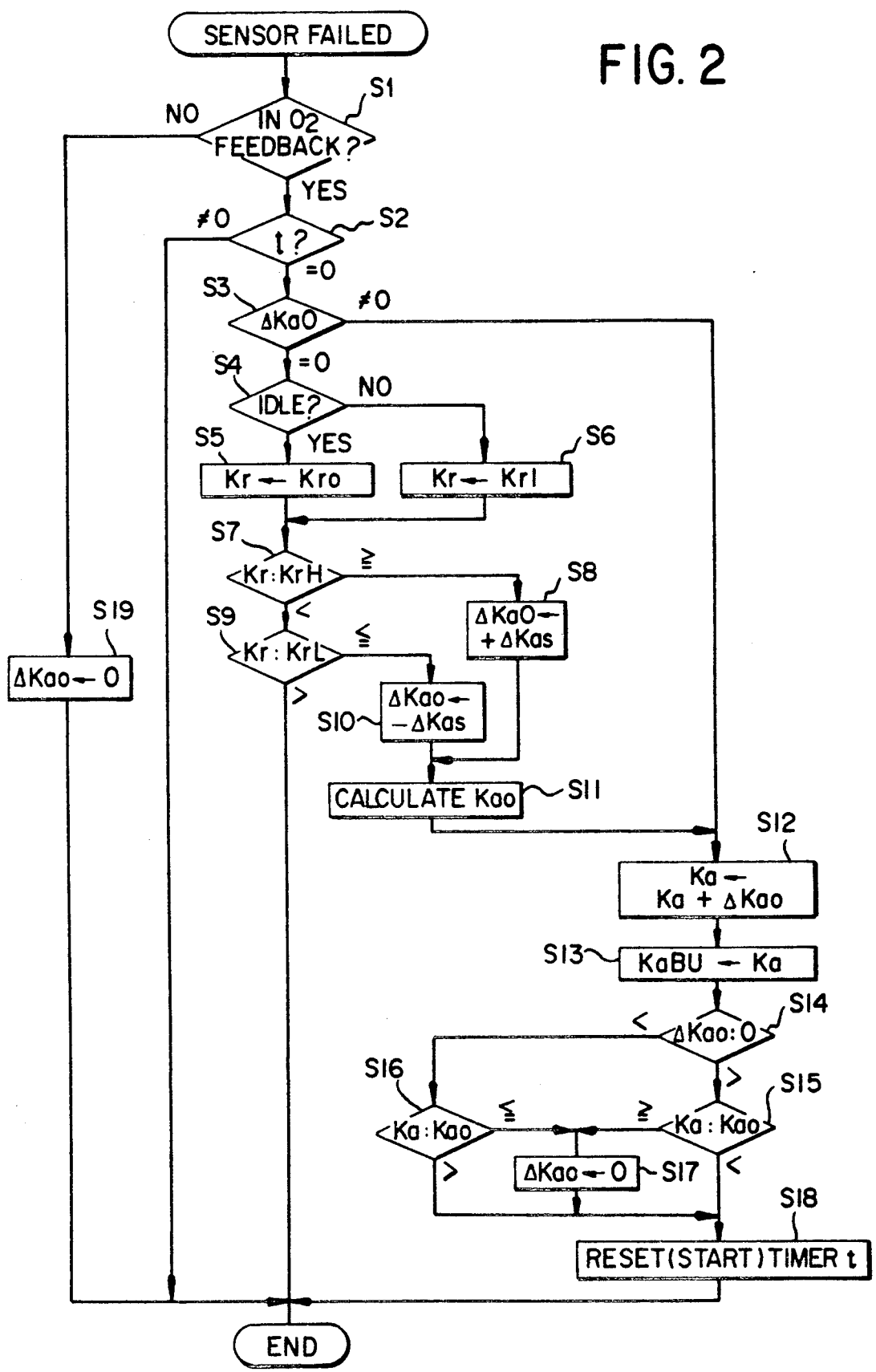
FIG. 2 is a flowchart showing mode of operation of the system to determine an alcohol correction factor when the alcohol sensor of FIG. 1 has failed.

Next, the mode of operation of the system will be explained. The characteristic feature of the invention is how to determine the alcohol correction factor Ka at the time it is determined that the alcohol sensor 44 has failed. This will now be explained with reference to the flowchart of FIG. 2.

When it has been determined that the alcohol sensor 44 is not operating normally by the manner just described before, it is first discriminated in step S1 whether or not the system is currently conducting the $O_2$ feedback control and if the result is affirmative, the procedure moves to step S2 in which it is discriminated whether or not a down counter (timer) t for setting a wait period for correction has counted down to zero. The value is initially set zero so that the procedure moves to step S3 in the first cycle in which it is determined if a unit correction amount delta Kao remains.

Figure 3:
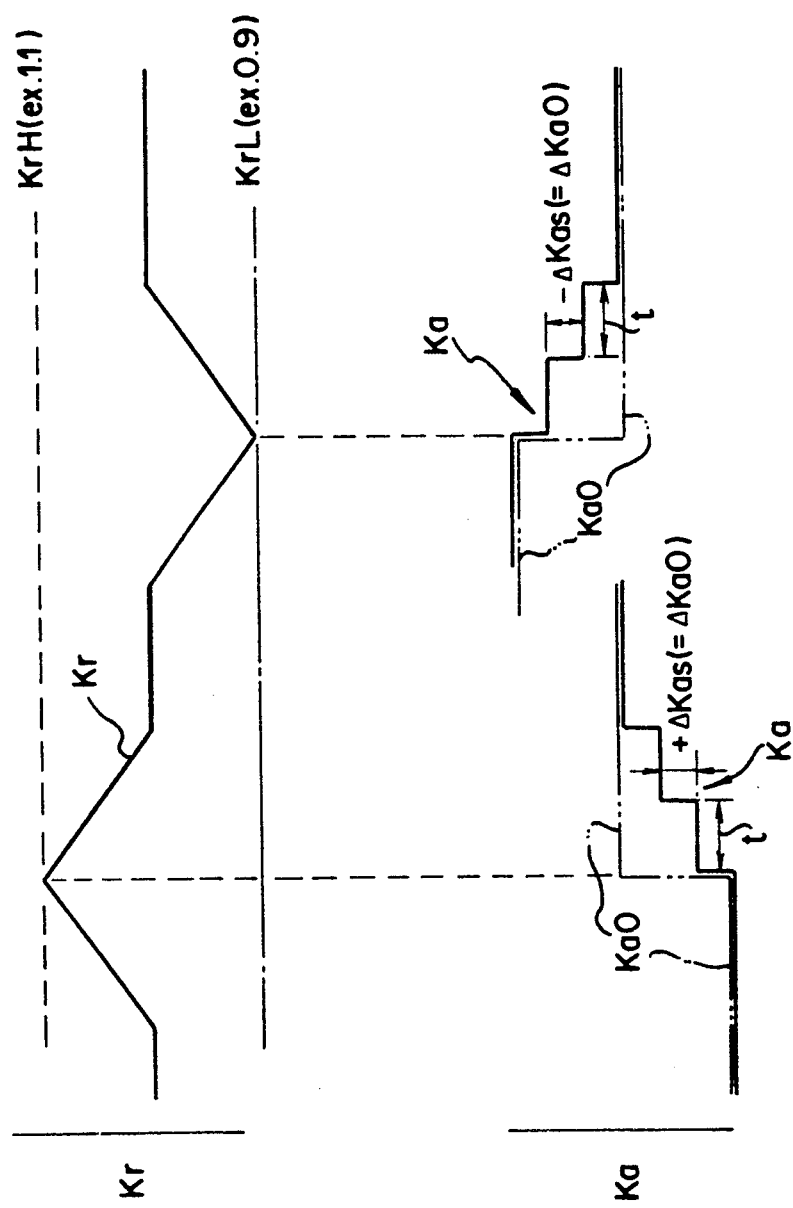
FIG. 3 is a timing chart explaining the determination illustrated in the flowchart of FIG. 2.

Before continuing the explanation, the characteristic feature of the control will be briefly stated here referring a timing chart illustrated in FIG. 3. When the alcohol sensor has failed, an average value Kr of the aforesaid correction factor $K_{O_2}$ is calculated. The average value Kr is thus around "1.0" and reflects a deviation between a target air-fuel ratio and an actual air-fuel ratio. A target alcohol correction value named "Kao" is determined based on an equation using the average value Kr in such a manner that it goes up and down as the value Kr fluctuates. The value Kr is then compared with a upper reference limit KrH ("1.1" for example ) and a lower reference limit KrL ("0.9" for example). Based on the comparison, the aforesaid correction factor Ka is adjusted to follow up the target value Kao by the unit amount delta Kao every time the wait time t has expired.

Again returning to FIG. 2 flowchart, since the unit amount delta Kao is initially zero, the procedure invariably moves from step S3 to step S4 in the first cycle. As the value of the oxygen content $V_{O_2}$ output by the oxygen sensor 38 tends to fluctuate wildly, it has to be averaged using a prescribed coefficient so as to hold down the amount of variation. Different coefficients have to be used for this purpose between when the engine is idling and when it is running at a speed higher than the idling speed. It is therefore discriminated in step S4 whether or not the engine is idling on the basis of the engine speed Ne and the throttle opening θth or the like. If it is, the procedure goes to step S5 in which an air-fuel ratio Kro calculated from the oxygen content signal averaged using the coefficient for idling state is stored as the average value Kr for comparison purposes, and if it is not, the procedure moves to step S6 in which another air-fuel ratio $Kr_1$ calculated from the oxygen content signal averaged using the coefficient for non-idling state is stored as the average value Kr. In the following step S7 the average value Kr is compared with the upper limit value KrH. If Kr≧KrH, the procedure advances to step S8. Since this means that the air-fuel mixture is on the lean side, a fixed value delta Kas is assigned a positive sign and used as the unit amount delta Kao. Otherwise the procedure moves to step S9 where Kr is compared with a lower limit value KrL and, if Kr≦KrL, the procedure goes to step 10. As this means that the air-fuel mixture is on the rich side, the value delta Kas is assigned a negative sign and used as the unit amount. Then in the following step S11 the target value Kao is calculated as follows:

$$Kao = Ka + (Kr - 1.0) \cdot \alpha$$

In the equation, α is a prescribed coefficient.

Upon completion of the calculation, the procedure advances to step S12 in which the current alcohol correction factor Ka, calculated from the output of the alcohol sensor 44 when the sensor had operated properly, is corrected by the unit amount delta Kao, as shown in FIG. 3, as the new alcohol correction factor Ka. The correction increases the value Ka when the fuel-air mixture is lean and decreases it when the air-fuel mixture is rich.

In the following step S13 a backup factor KaBU is renewed to the value of the corrected alcohol correction factor Ka. The backup factor KaBU is used as the alcohol correction factor Ka during the open loop control implemented at engine starting etc.

The procedure then advances to step S14 and from this step the procedure advances along one branch starting with step S16 if the unit amount delta Kao is negative (the air-fuel mixture is rich) and along another starting with step S15 if it is positive (lean). In steps S15 and S16 it is discriminated whether or not the alcohol correction factor Ka corrected in step S12 has reached the updated target value Kao calculated in step S11 and if it has not, the procedure goes to step 18 in which the timer is reset and the program restarted from step S1. If it has, the procedure moves to step S17 in which the unit amount delta kao is reset to zero and then back to step S1 via step S18. If the former case (when the correction has not been completed), the unit amount delta Kao will not be zero when the procedure reaches step S3 in the following cycle and, therefore, the procedure will advance from step S3 to step S12, whereafter the foregoing correction process will be repeated. In the latter case, the procedure goes from step S3 to step S4. In that instance, since the correction has been completed, however, the procedure thereafter moves straight down in the drawing through steps S7 and S9 and no further correction is carried out until it is found that the average value Kr has reached the upper limit value KrH or the lower limit value KrL, or has moved out of the range between the values. When switchover to open loop control occurs in the course of program execution, the procedure moves from S1 to S19, where the unit amount delta Kao is set to zero. Therefore, when feedback control is resumed, the program is executed in the manner first described above.

The arrangement is thus such that when the alcohol sensor has failed, the factor Ka is determined to follow up the target value Kao which in turn is calculated from the average value Kr indicating the actual air-fuel ratio. The factor Ka is used during feedback control, while the backup factor KaBU updated by the factor Ka being used during open loop control. Therefore, it is able to maintain the amount of fuel injected at the optimum value even when the alcohol sensor fails.

The present invention has thus been shown and described with reference to the specific embodiments. However, it should be noted that the present invention is in no way limited to the details of the described arrangements but changes and modifications may be made without departing from the scope of the appended claims.

What is claimed is:

1. A system for controlling an air-fuel ratio for an internal combustion engine provided with a blended flue of gasoline and alcohol, the system having first means for detecting alcohol concentration in the fuel to obtain an alcohol correction factor, and control means for correcting an amount of fuel supply at least in response to the obtained alcohol correction factor,
wherein the improvement comprises:
second means for detecting oxygen content of the engine exhaust gas to obtain an air-fuel ratio correction factor;
third means for determining an average value of the air-fuel ratio correction factor; and
fourth means for correcting the alcohol correction factor in response to the determined average value when the first means has been found to fail.

2. A system according to claim 1, wherein said third means compares the average value with a first reference value set at a rich direction in terms of the oxygen content and a second reference value set at a lean direction in terms of the oxygen content and decreases the alcohol correction factor when the average value reaches the first reference value, while increasing the alcohol correction factor when the average value reaches the second reference value.

3. A system according to claim 2, wherein said third means increases or decreases the alcohol correction factor by a unit amount.

4. A system according to claim 2, wherein said third means increases or decreases the alcohol correction factor by a unit amount when a predetermined wait period has expired.

5. A system according to claim 3 or 4, wherein the unit amount is a fixed amount.

6. A system according to claim 1, wherein said control means uses the corrected alcohol concentration factor in determining the fuel supply at engine starting, when the first means has been found to fail.

7. A system for controlling an air-fuel ratio for an internal combustion engine provided with a blended fuel of gasoline and alcohol, comprising:
first means for detecting oxygen content of the engine exhaust gas;
second means for determining an air-fuel ratio of the mixture provided to the engine in response to the detected oxygen content;
third means for detecting alcohol concentration in the fuel;
control means for determining the amount of fuel supply at least in response to the determined air-fuel ratio and the alcohol concentration such that a deviation between the determined air-fuel ratio and a target air-fuel ratio decreases;
fourth means for determining an average value of the determined air-fuel ratio; and
fifth means for correcting alcohol concentration, when the third means has been found to fail, by adjusting the detected alcohol concentration by a fixed amount if the average value reaches a reference limit.

8. A system for controlling an air-fuel ratio for an internal combustion engine provided with a blended fuel of gasoline and alcohol, comprising:
first means for detecting oxygen content of the engine exhaust gas;
second means for determining an air-fuel ratio of the mixture provided to the engine in response to the detected oxygen content;
third means for detecting alcohol concentration in the fuel;
control means for determining the amount of fuel supply at least in response to the determined air-fuel ratio and the alcohol concentration;
fourth means for determining an average value of the determined air-fuel ratio; and
fifth means for correcting alcohol concentration, when the third means has been found to fail, by adjusting the detected alcohol concentration by a fixed amount if the average value reaches a reference limit.

9. A system according to claim 8, wherein said control means uses the corrected alcohol concentration in determining the fuel supply at engine starting when the third means has been found to fail.

* * * * *